July 1, 1958

T. A. WOOLSEY ET AL 2,841,420

V-BAND CLAMP WITH CLAMPING BAND AND COMBINED
GUIDE AND BRACING YOKES

Filed April 24, 1956

THEODORE A. WOOLSEY
ALBERT D. HERMAN
LEONARD L. RICE
INVENTOR.

BY Lynn H. Latta

—ATTORNEY—

United States Patent Office 2,841,420
Patented July 1, 1958

2,841,420

V-BAND CLAMP WITH CLAMPING BAND AND COMBINED GUIDE AND BRACING YOKES

Theodore A. Woolsey, Albert Dale Herman, and Leonard L. Rice, Los Angeles, Calif., assignors to Aeroquip Corporation, Jackson, Mich., a corporation of Michigan Application April 24, 1956, Serial No. 580,336

2 Claims. (Cl. 285—421)

This invention relates to band clamps for coupling flanged members such as tube sections in a fluid line, structural pillars, either tubular or solid, and other members having coupling flanges. Such clamps are commonly referred to as V-band clamps, and embody flange retainer segments of channel section, the sides of which are usually in flared relation so as to exert a wedging effect on flanges embraced by them, whereby to crowd the flanges into tight coupling association. The segments are usually attached to a constrictor band which encircles them and has means for developing a constricting action to draw the segments tightly around the flanges.

The wedging action of the retainer segments develops axial loads which tend to spread the sides (jaws) of the segments, impairing their coupling efficiency. To overcome the spreading tendency, it is customary to reinforce the jaws by means of marginal flanges, commonly referred to as "feet."

Another problem in a V-band clamp, is the problem of circumferential shifting of the segments against the coupling flanges as the band clamp is taken up circumferentially to tighten the joint.

One of the objects of this invention is to provide novel, improved V-band clamp having a slipping connection between the retainer segments and the constrictor band, whereby the segments may remain in fixed positions circumferentially while the band slips against them in the constricting operation.

Another object is to provide such a slipping band clamp having improved means for transmitting reinforcing loads to the segment jaws in a manner to effectively oppose the spreading tendency. More specifically, it is an object to provide such a band clamp embodying a novel and improved yoke member combining the function of providing a guide for the slipping band and transmitting from the band to the segment feet, radial loading to buttress the segment jaws against spreading.

A further object is to provide an improved V-band clamp having an improved slipping band arrangement utilizing anti-friction means between the band and the retainer segments, for minimizing friction in the slipping action.

Other objects wll become apparent in the ensuing specifications and appended drawing in which.

Figure 1:
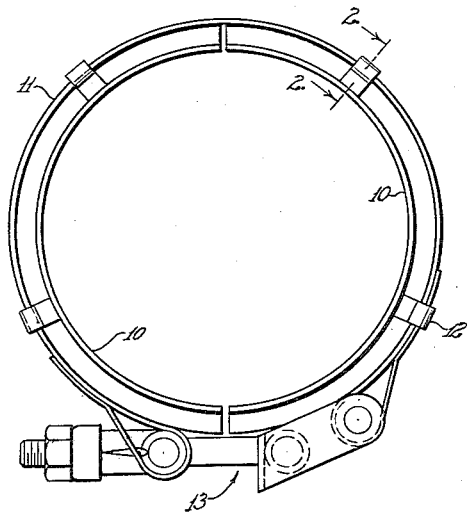
Fig. 1 is an end view of a clamp embodying the invention.

The invention as disclosed in Fig. 1

Referring now to the drawing in detail, and in particular to Fig. 1, we have shown therein, as an example of one form in which the invention may be embodied, a V-band clamp comprising generally a series of retainer segments 10, a constrictor band 11 to which the retainer segments 10 are attached, a series of yokes 12 providing a slipping attachment between the segments 10 and the band 11, and connector means 13 for drawing the ends of the band together to tighten the clamp around a flange joint. Such joint may, for example, comprise opposed flanges 14 (Fig. 3) on the ends of respective tube sections 15 to be coupled together, with flanges 14 clamped against a gasket 16 and the joint thereby sealed.

A wedging action, for tightly clamping the flanges 14 together, is derived from the radially inward movement of inwardly diverging frusto conical sides or jaws 17 of the channel segments 10, bridged by a crown section or apex 18 at the periphery of the clamp, and provided with axially projecting flanges or feet 19 at their radially inward margins.

Yokes 12 may be formed from strap metal. Each yoke comprises a pair of legs 20 bearing against segment feet 19 and secured thereto as by rings of welding 21; shoulders 22 projecting axially outwardly from the legs 20, return bends 23 joined to shoulders 22, and a bridge 24 extending between and joining the return bends 23. The extremities of bridge 24, in opposed spaced relation to shoulders 22, cooperate therewith and with return bends 23 to define guide loops in which the marginal portion of band 11 are slidably retained.

Figure 2:
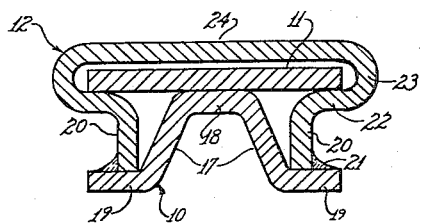
Fig. 2 is a sectional view thereof taken on line 2—2 of Fig. 1.

The invention as disclosed in Fig. 2

In the form of the invention as disclosed in Fig. 2, the shoulders 22 are disposed in alignment with apex 18, and band 11 bears simultaneously against apex 18 and shoulders 22 with a slipping engagement. The shoulders 22 amplify the bearing area provided by apex 18 so that the band may more readily slide with relation to the segments 10 while exerting radially contracting pressure thereagainst.

In the operation of the invention, the clamp may be opened up by separating it at connector 13, spreading the segments 10, fitting the clamp over the assembled flanges 14 and again coupling the ends of the clamp through connector 13 and operating the latter to draw the ends of the band 11 together. Thus the segments 10 are drawn radially inwardly against flanges 14, exerting a wedging effect by which the flanges are clamped tightly against one another or against gasket 16. After the segments have gripped the flanges 14, they will remain fixed against circumferential shifting while the band 11 slips within yokes 12 to effect its circumferential takeup action.

An important function of the yokes 12, in addition to their serving as guides for band 11, is the transmission of radial loads inwardly from the margins of band 11 through legs 20 to feet 19 of the retainer segments 10, so as to restrain the tendency of jaws 17 to spread apart when exerting wedging pressure against flanges 14. Legs 20 thus function as struts, and the shoulders 22 function as the heads of the struts to receive the pressure from band 11. Also, the bridge 24, joined to shoulders 22 through return bend 23, cross-braces the shoulders 22 so that they will transmit the pressure to legs 20 without yielding.

Figure 3:
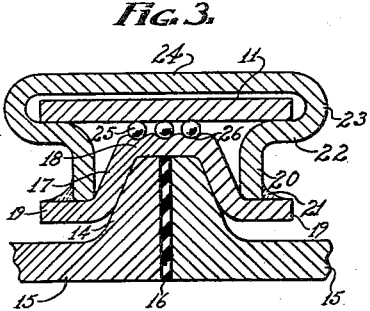
Fig. 3 is a sectional view of a modified form of the clamp.
Figure 4:
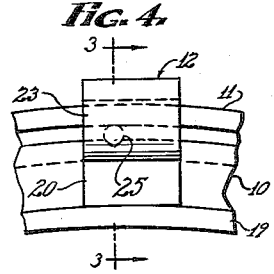
Fig. 4 is a fragmentary end view of the clamp of Fig. 3.

The invention as disclosed in Figs. 3 and 4

Referring now to Figs. 3 and 4, instead of direct bearing engagement of band 11 against apex 18, a series of bearing balls 25 are interposed between apex 18 and band 11, being seated and retained in shallow conical recesses 26 in apex 18.

Figure 6:
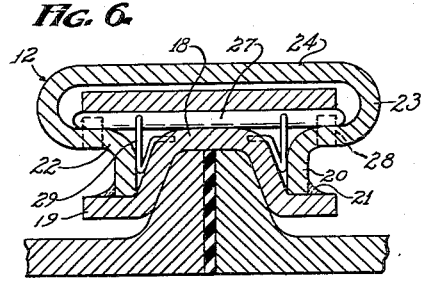
Fig. 6 is a sectional view of the clamp of Fig. 5, taken on line 6—6 thereof.
Figure 5:
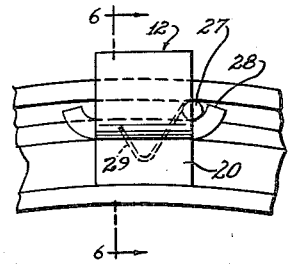
Fig. 5 is a fragmentary end view of another modified form of the invention.

*The invention as disclosed in Figs. 5 and 6*

In the arrangement shown in Figs. 5 and 6, roller bearings of needle bearing proportions, indicated at 27, are interposed between band 11 and segments 10, with their central portions in rolling engagement with apex 18 and with their end portions in rolling bearing engagement with shoulders 22. Stop fingers 28, formed integrally with shoulders 22, project axially therefrom and are thence bent outwardly to block the path of rolling movement of bearings 27 at the respective limits thereof.

A pair of springs 29, each including an arm anchored to segment 10 (or to yoke arm 20) and a free arm which yieldingly bears against a respective end of roller 27 as indicated, function to yieldingly bias the roller toward one limit of rolling movement, i. e., the limit position away from which it would tend to roll when the band is drawn tightly against the segments. The springs 29 are effective to maintain the bearing roller normal to the plane of the joint, i. e., parallel to the axis of the fluid line, avoiding canting of the roller such as would interfere with its rolling in a truly circumferential direction.

We claim:

1. In a band clamp for coupling flanged members: a plurality of retainer segments for collectively encircling and embracing a pair of abutted flanges, said segments being of rolled channel section including an apex, a pair of jaws extending generally radially inwardly from respective sides of said apex, and a foot extending axially outwardly from each of the respective jaws at its inner margins; a constrictor band for drawing said segments radially inwardly, said band encircling the segments outwardly of the apexes thereof; connector means for drawing the ends of said band together; and a plurality of formed strap metal yokes each including a pair of laterally spaced legs secured to respective feet of a respective segment, a pair of shoulders extending axially outwardly from the respective legs and axially aligned with the segment apex, return bends joined to the outer extremities of said shoulders, and a bridge joining said return bends and overlying said band, the extremities of said bridge cooperating with said shoulders and return bends to provide opposed guide loops in which the respective margins of said band are slidably retained, and anti-friction rollers interposed between said band and respective segments and in rolling engagement with said apex and shoulders, for transmitting to the segment feet through said legs, radial loads developed in said band by the constriction thereof.

2. In a band clamp for coupling flanged members: a plurality of retainer segments for collectively encircling and embracing a pair of abutted flanges, said segments being of rolled channel section including an apex, a pair of jaws extending generally radially inwardly from respective sides of said apex, and a foot extending axially outwardly from each of the respective jaws at its inner margins; a constrictor band for drawing said segments radially inwardly, said band encircling the segments outwardly of the apexes thereof; connector means for drawing the ends of said band together; and a plurality of formed strap metal yokes each including a pair of laterally spaced legs bearing against respective feet of a retainer segment and secured to the segment, a pair of shoulders extending axially outwardly from the respective legs, return bends joined to the outer extremities of said shoulders, and a bridge joining said return bends and overlying said band, the extremities of said bridge cooperating with said shoulders and return bends to provide opposed guide loops in which the respective margins of said band are slidably retained, said shoulders being substantially aligned with said apex and said band margins being in load transmitting association with said shoulders for transmitting to the segment feet through said legs, radial loads developed in said bands by the constriction thereof, and anti-friction rollers interposed between said band and segments and in rolling engagement with said band, said apex and said shoulders; stops projecting outwardly in obstructing relation to the ends of said rollers within the area of their respective yokes, and spring means yieldingly engaging the ends of the rollers and biasing them toward engagement with said stops at one limit of rolling movement; said rollers functioning to transmit to the segment feet through said legs, radial loads developed in said band by the constriction thereof.

References Cited in the file of this patent

UNITED STATES PATENTS

| | | |
|---|---|---|
| 2,353,572 | Kuster et al. | July 11, 1944 |
| 2,403,606 | Meyer | July 9, 1946 |
| 2,473,459 | Weise | June 14, 1949 |
| 2,548,249 | Woolsey | Apr. 10, 1951 |
| 2,602,678 | Mahoff et al. | July 8, 1952 |

FOREIGN PATENTS

| | | |
|---|---|---|
| 126,655 | Great Britain | May 22, 1919 |
| 851,292 | Germany | Oct. 2, 1952 |